H. J. SCHMITZ.
FRUIT CANNER.
APPLICATION FILED MAY 25, 1920.
1,388,065.
Patented Aug. 16, 1921.
3 SHEETS—SHEET 3.
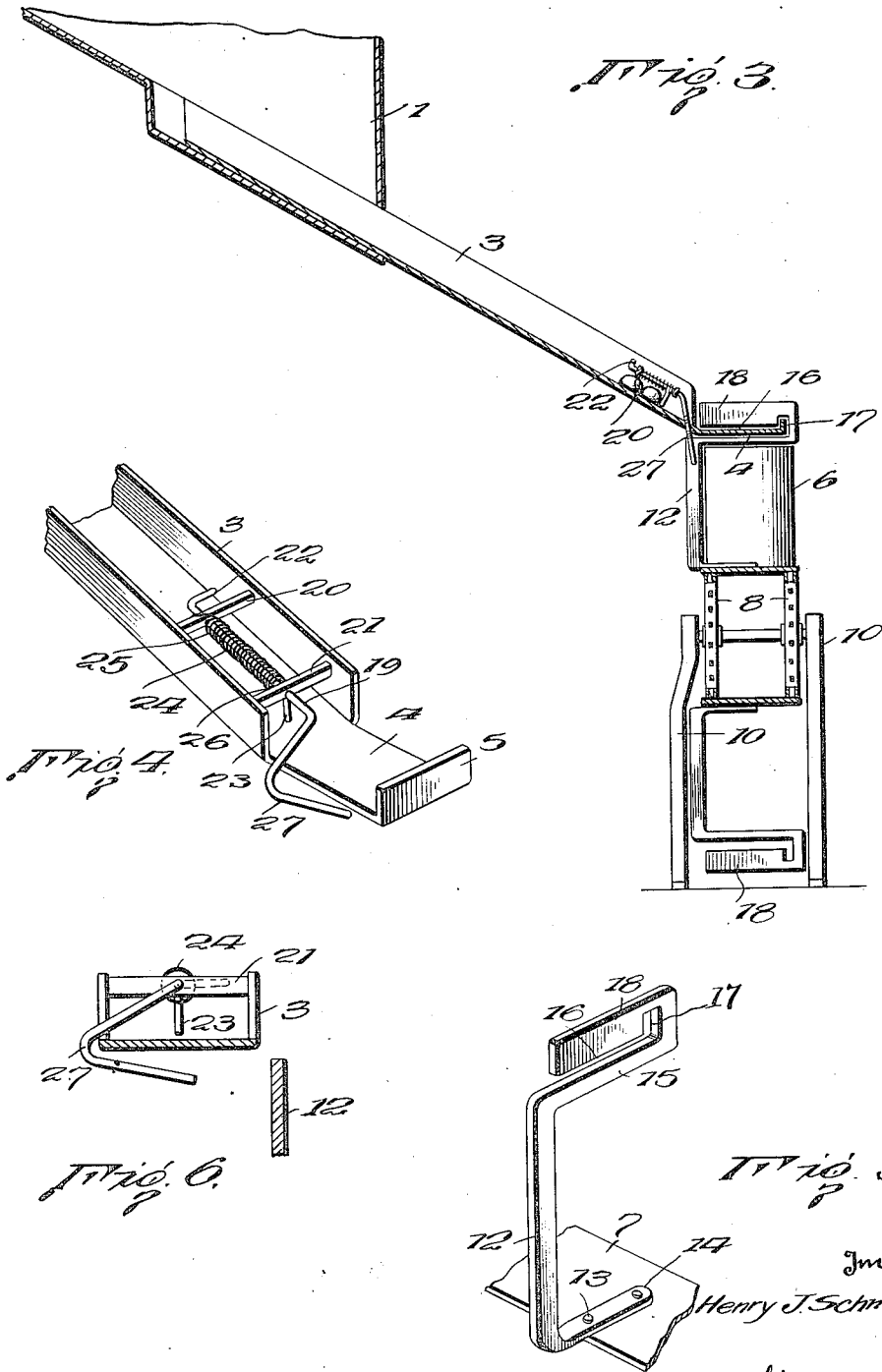

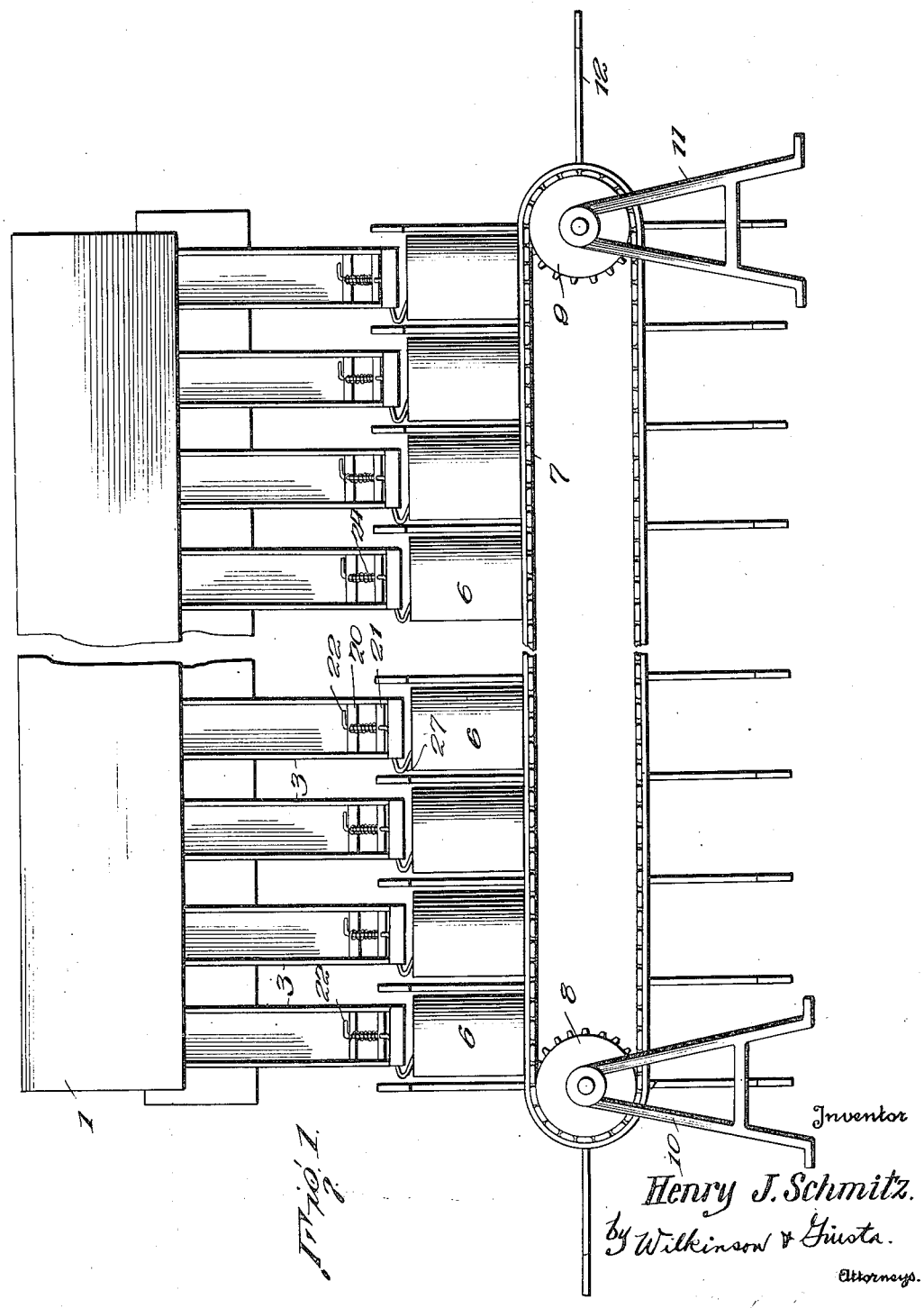

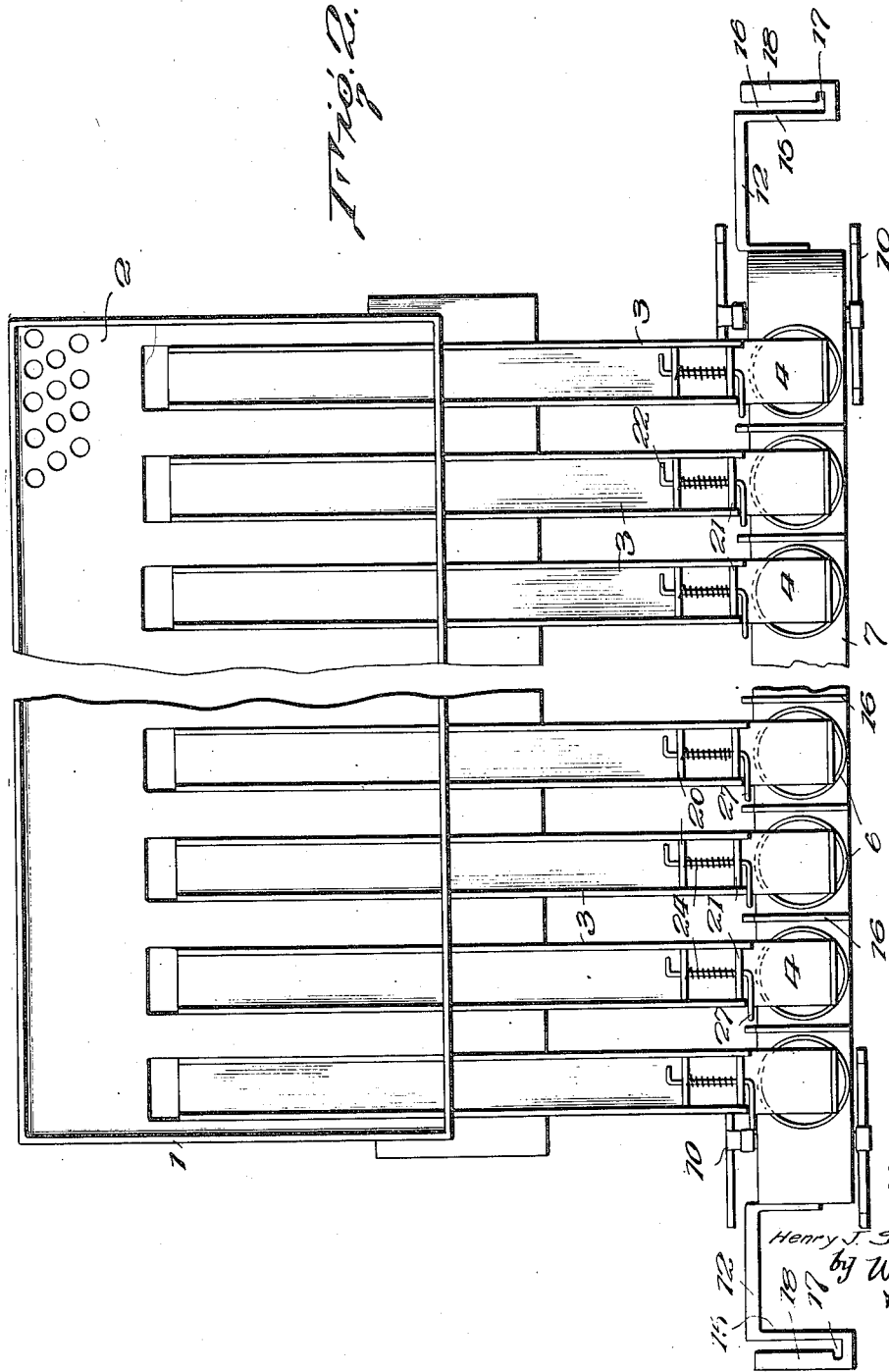

UNITED STATES PATENT OFFICE.

HENRY J. SCHMITZ, OF BERKELEY, CALIFORNIA.

FRUIT-CANNER.

1,388,065.  Specification of Letters Patent. Patented Aug. 16, 1921.

Application filed May 25, 1920. Serial No. 384,196.

*To all whom it may concern:*

Be it known that I, HENRY J. SCHMITZ, a citizen of the United States, residing at Berkeley, in the county of Alameda and State of California, have invented certain new and useful Improvements in Fruit-Canners; and I do hereby declare the following to be a full, clear, and exact description of the invention, such as will enable others skilled in the art to which it appertains to make and use the same.

The present invention relates to improvements in fruit canners, and has for an object to provide an improved machine for insuring the delivery of a predetermined number of pieces of fruit to each can in an automatic and reliable manner.

Another object of the invention lies in providing an improved canning machine in which a simple and inexpensive device is employed to act in conjunction with a conveyer on which the cans are moved past a plurality of chutes whereby a desired number of pieces of fruit may be delivered to each of the cans from the chutes so that when each can has traversed the entire number of chutes it will be made to contain a predetermined and uniform number of the pieces of fruit.

In the accompanying drawings forming a part of this application, and in which similar reference symbols indicate corresponding parts in the several views:

Figure 1 is a side view of an improved canning machine constructed in accordance with the present invention.

Fig. 2 is a top plan view thereof.

Fig. 3 is an enlarged cross sectional view through the same.

Fig. 4 is a fragmentary perspective view of one of the chutes and the fruit controlling device.

Fig. 5 is a similar view of one of the pick-off arms; and

Fig. 6 is a transverse sectional view through the chute.

Referring more particularly to the drawings, 1 designates a holder for the fruit in which is placed a shaker screen 2 to insure the delivery of the pieces of fruit to chutes 3 communicating with the holder 1 at one side thereof near its base, and being disposed in inclined positions to allow the fruit to descend onto the platform 4 provided at the lower ends of each of the chutes.

The chutes 3 are provided in any suitable number, in accordance with the requirements of the particular fruit and the number of pieces to be placed in each can.

While the chutes 3 are disposed at an inclination so that the pieces of fruit may descend by gravity therethrough from the holder 1, the platforms 4 extend substantially horizontally in order to hold a predetermined number of pieces in readiness to be swept therefrom into the cans by pick-off arms, hereinafter described. The upturned end 5 of the platform 4 serves to limit the movement of the fruit and prevent its accidentally sliding off the platform in case it should descend from the chute with too great force.

The cans to receive the fruit are designated at 6, and are supported on a conveyer 7 of the endless type moving about sprocket wheels or drums 8 and 9 which are supported at an elevation by bearing stands 10 and 11.

The conveyer 7 is provided with a plurality of pick-off arms 12 having horizontal base portions 13, riveted or otherwise secured to the conveyer as indicated at 14. The base portions 13 extend to that side of the conveyer 7 next the chutes 3 so that the arm 12 extends at right angles from the conveyer belt and at one side thereof. As indicated in Fig. 1, the cans 6 are intended to be placed on the conveyer belt 7 just in advance of the arms 12 which controls the delivery of fruit thereto.

At their upper ends the arms 12 are provided with cross bars 15 extending parallel with the base portions 13 and overlying the conveyer belt 7. The cross bars 15 are slotted horizontally, as indicated at 16, to receive the platforms 4 of the chutes, a vertically disposed slot 17 being supplied at the inner end of the slot 16 of substantially the form of the turned up end 5 of each platform 4 so that the pick-off device may pass in sequence through all of the platforms. A sweep 18 is left above the slot 16, and is so positioned and constructed as to wipe over the upper faces of the platforms 4 and push any pieces of fruit thereon into the open upper ends of the cans 6 which may immediately precede such sweeps.

As shown more particularly in Fig. 4, each of the chutes 3 is provided with a controlling device for limiting the number of the pieces of fruit which are admitted at any one time to the platform 4. This device is shown in Figs. 3 and 4 as constructed to allow of two pieces resting on the platforms 4, although if a greater or less number is desired the device may be modified in an obvious manner. This controlling device consists of a rock shaft 19 journaled in rods 20 and 21 extending transversely in the side walls of the chute.

Pins 22 and 23 project at right angles from the rock shaft 19 and are disposed at different angular positions as respects the rock shaft, so that when the pin 23 projects directly downward and in the path of the pieces of fruit, the upper pin 22 will be withdrawn from the fruit and will lie substantially parallel with the adjacent bar 20 so as to permit the fruit to descend so far as is permitted by the lower pin 23. The pins 22 and 23, as shown, are spaced apart a distance corresponding to the width of two of the pieces of fruit, so that when in the position shown in Figs. 3 and 4 two of the pieces of fruit may descend past the upper pin 22, where they will be held in the lower part of the chute by the lower pin 23.

A coil spring 24 is wound about the rock shaft 19 between the bars 20 and 21, and has one end 25 thereof secured to said rock shaft while the other end 26 is affixed to the lower bar 21. The action of the spring 24 is to normally and yieldingly hold the parts in the position shown in Figs. 3 and 4, while at the same time permitting of the oscillating movement of the shaft and the pins carried thereby.

A finger 27 is formed integrally with or attached to the lower end of the rock shaft 19 and is bent down at a lower level than the platform 4 in order to be engaged by the arms 12 of the conveyer 7. The action is intended to be such that when any one of the arms 12 engages a finger 27 the rock shaft 19 will be swung in a clockwise direction, locking out the lower end thereof an angular distance sufficient to withdraw the lower pin 23 from engagement with the pieces of fruit, thus allowing them to descend by gravity into the platform 4; while at the same time bringing the upper pin 22 into engagement with the pieces of fruit lying above the same on the chute to prevent descent of the latter while the lower pin 23 is in the withdrawn position.

It will be apparent, therefore, that the device will admit precisely two pieces of fruit to the platform at each subsequent actuation. Consequently each can as it passes any particular chute will receive from the platform 4 thereof by means of the sweep 18, two such pieces of fruit, the controlling device immediately admitting a like number of subsequent pieces of fruit as soon as any particular can has passed the same.

The cans may be automatically delivered to the conveyer and automatically removed therefrom in any desired manner.

It is obvious that those skilled in the art may vary the details of construction and arrangements of parts without departing from the spirit of my invention, and therefore I do not wish to be limited to such features except as may be required by the claims.

I claim:

1. In a fruit canner, a holder for the fruit, chutes leading from the holder and inclining downwardly, platforms disposed to receive the fruit from the lower ends of said chutes, flanges on the platforms opposite the chutes, a conveyer passing beneath the platforms and adapted to carry containers therebeneath, and sweeps carried by said conveyer and being slotted to fit about the platforms and said flanges, substantially as described.

2. In a fruit canner, a holder for the fruit, a plurality of chutes leading therefrom, platforms at the lower ends of the chutes, a conveyer passing beneath the platforms, sweeps carried by said conveyer for removing the fruit from the platforms, an arm carried by each chute in the path of the sweeps, and means controlled by said arm for regulating the quantity of fruit admitted to the platforms, substantially as described.

3. In a fruit canner, the combination of a holder for the fruit, a plurality of chutes inclining downwardly from the holder, platforms at the lower ends of the chutes, a rock shaft journaled longitudinally in the central portion of each chute near its lower end and having pins extending downwardly therefrom at spaced points, said pins being disposed at substantially right angles, yieldable means for holding the lowermost pin in the path of the fruit descending the chute, a conveyer for carrying containers beneath the platforms, and sweep means carried by said conveyer and acting on said rock shafts, to remove the lower pin from the path of the fruit and at the same time insert the upper pin in the path of such fruit, substantially as described.

4. In a fruit canner, a succession of platforms adapted to receive fruit, a conveyer having a number of receptacles thereon passing beneath the platforms, means carried by the conveyer for sweeping the fruit from the platforms into the receptacles, and means associated with the platforms and acted on by said last named means for controlling the delivery of fruit to the platforms in predetermined quantities, substantially as described.

5. In a fruit canner, a source of fruit supply, a number of inclined chutes leading therefrom, platforms at the lower ends of the chutes, means for controlling the delivery of the fruit from the chutes to the platforms, said means including a pair of offset pins spaced apart a distance corresponding to the quantity of the fruit desired, said pins adapted to alternately engage the fruit, means whereby the lower pin may be normally and yieldingly held in engagement with the fruit, a conveyer adapted to bring a series of cans successively beneath the platforms, means for sweeping the fruit from the platforms into the cans, and a device acted on by said last named means for withdrawing the lower pin from the fruit to allow of the delivery of subsequent pieces to the platform and at the same time inserting the upper pin in the path of the fruit, substantially as described.

6. In a fruit canner, the combination of a holder for the fruit, a number of chutes leading from the holder, a shaker screen in the holder for delivering the fruit to the chutes, platforms at the lower ends of the chutes, an endless conveyer operating beneath the platforms and adapted to carry cans therebeneath, sweeps carried by said conveyer for brushing the fruit from the platforms in the cans, and means in the lower ends of the chutes adjacent the platforms for regulating the number of pieces of fruit to be delivered to the platform and acted on by said sweep means for automatically permitting of the delivery of fruit to the platforms, substantially as described.

HENRY J. SCHMITZ.